United States Patent
Senner et al.

(10) Patent No.: US 6,355,177 B2
(45) Date of Patent: Mar. 12, 2002

(54) WATER FILTER CARTRIDGE REPLACEMENT SYSTEM FOR A REFRIGERATOR

(75) Inventors: Kurt C. Senner; Robert L. Wetekamp, both of Galesburg, IL (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 09/867,476

(22) Filed: May 31, 2001

Related U.S. Application Data (63) Continuation-in-part of application No. 09/520,237, filed on Mar. 7, 2000, now Pat. No. 6,303,031.

(51) Int. Cl.⁷ .................. F25D 23/12; B01D 35/02; B01D 17/12
(52) U.S. Cl. ............... 210/739; 210/88; 210/89; 210/234; 210/416.3; 210/444; 62/339
(58) Field of Search .............. 210/739, 85, 88, 210/89, 138, 234, 235, 98, 416.3, 443, 444; 222/189.06; 62/339

(56) References Cited

U.S. PATENT DOCUMENTS

| | | |
|---|---|---|
| 4,681,677 A | 7/1987 | Kuh et al. |
| 4,918,426 A | 4/1990 | Butts et al. |
| 5,050,772 A | 9/1991 | Brane et al. |
| 5,083,442 A | 1/1992 | Vlock |
| 5,089,144 A | 2/1992 | Ozkahyaoglu et al. |
| 5,135,645 A * | 8/1992 | Sklenak et al. |
| 5,188,727 A | 2/1993 | Kurth et al. |
| 5,211,024 A | 5/1993 | Manz et al. |
| 5,236,578 A | 8/1993 | Oleskow et al. |
| 5,285,718 A * | 2/1994 | Webster et al. |
| 5,336,406 A * | 8/1994 | Stanford et al. |
| 5,435,909 A | 7/1995 | Burrows |
| 5,458,766 A | 10/1995 | Ehara et al. |
| 5,527,451 A | 6/1996 | Hembree et al. |
| 5,540,107 A | 7/1996 | Silverman et al. |
| 5,622,618 A | 4/1997 | Brane et al. |
| 5,674,381 A | 10/1997 | Dekker |
| 5,676,824 A | 10/1997 | Jeon et al. |
| 5,707,518 A | 1/1998 | Coates et al. |
| 5,715,699 A | 2/1998 | Coates et al. |
| 5,814,212 A | 9/1998 | Hsu |
| 5,865,991 A | 2/1999 | Hsu |
| 5,907,958 A | 6/1999 | Coates et al. |
| 6,120,685 A * | 9/2000 | Carlson et al. |
| 6,284,129 B1 * | 9/2001 | Giordano et al. |
| 6,303,031 B1 * | 10/2001 | Senner |

* cited by examiner

Primary Examiner—David A. Simmons
Assistant Examiner—Fred Prince
(74) Attorney, Agent, or Firm—Diederiks & Whitelaw, PLC.

(57) ABSTRACT

A water filtering system for a refrigerator determines a need for a filter change by timing the period of actuation of at least one valve used to regulate the flow of filtered water to both a water dispenser and an ice maker. Based on a known flow rate, a volume of filtered water associated with the duration of valve actuation is calculated. A summing device determines an accumulated, filtered water volume. When the accumulated, filtered water volume reaches or exceeds a threshold value, an indicator is used to signal that the water filter needs to be replaced. As water filtering system of the invention is capable of being operated without a water filter in place, a switch assembly is incorporated to sense the presence of the water filter and the system only senses the valve actuation time when the filter is in place. In addition, provisions are made to reset the accumulated, filtered water volume upon replacement of the water filter.

18 Claims, 7 Drawing Sheets

WATER FILTER CARTRIDGE REPLACEMENT SYSTEM FOR A REFRIGERATOR

This application represents a continuation-in-part of U.S. patent application Ser. No. 09/520,237 filed Mar. 7, 2000, now U.S. Pat. No. 6,303,031.

BACKGROUND OF THE INVENTION

1. Field of the Invention

The present invention pertains to the art of water filtering systems and, more particularly, to a water filtering system incorporating a replaceable filter cartridge and a replacement reminder arrangement for use in a refrigerator.

2. Discussion of the Invention

Providing water dispensers and automatic ice makers in household refrigerators has become extremely commonplace. In addition, there is a growing trend towards increasing the purity of all consumed water. For at least these reasons, it has heretofore been proposed in the art to incorporate a water purifying system in a refrigerator in order to filter the water supplied to a water dispenser and/or ice maker. Early proposed purifying systems of this type centered around providing a filtering unit between the water supply and the conduit entering the refrigerator. These systems were typically installed by service personnel as aftermarket add-on units. More recently, it has been proposed to incorporate filter assemblies during the overall manufacturing of refrigerators, while utilizing filters which can be fairly, readily accessed for replacement directly by consumers.

In developing an improved water filtering system, many factors need to be considered, including associated manufacturing costs, ease of use, manner of operation and reliability. Although various refrigerator water filtering assemblies are known in the art, many improvements are left to be made to simplify known filtering assemblies while increasing reliability, particularly with respect to the manner and ease in which filter cartridges can be effectively and timely replaced.

To this end, there have been a fair number of proposals concerning different arrangements for determining when a filter cartridge of a water filtering system should be changed. For instance, in the field of refrigerator water filtering systems, it has been proposed to monitor the total time period since a filter cartridge was initially installed and to indicate a need for the filter to be changed after a predetermined period of time elapses. In addition, it is been heretofore proposed to sensing a fluid flow volume associated with a filter assembly in order to indicate the need to change the filter of the assembly. Time based filter changing systems typically do not represent the most efficient replacement indicators since the elapsed time need not be directly related to the actual in-use time of the filter. Arrangements which accumulate the time during which a flow controlled switch is activated are also known, but such arrangements either require a minimum flow rate in which to activate the switch or provide commensurate signals regardless of varying flow rates, such that these arrangements are not generally accurate.

Volumetric based systems typically function to either mechanically sense a filtered flow rate or electronically sense flow based on monitoring a differential pressure across a flow restriction. Although volume based systems may offer some significant benefits over simple time based systems, the cost of known volume based systems are considered to be generally prohibitive. In addition, water filter replacement systems which directly sense flow volumes are prone to failure, particularly given the life expectancy of a modern refrigerator. In any event, based on the above, there exists a need in the art for a cost effective and reliable water filter replacement reminder system for a refrigerator. In addition, there is considered a need for an arrangement to signal when a filter cartridge has been replaced in order to reset the overall indicator arrangement.

SUMMARY OF THE INVENTION

The present invention is directed to a water filter arrangement for a refrigerator and, particularly, to a water filter cartridge replacement system. Preferably, the filter cartridge is mounted in a clearly visible and accessible location for ease of replacement by the consumer. In the most preferred embodiment, the refrigerator is provided with a temperature control housing mounted in an upper rear portion of the fresh food compartment. The control housing covers a portion of a filter mounting head to which the filter cartridge is selectively secured to complete a water circuit for the system.

In accordance with a preferred embodiment of the invention, the filter cartridge includes a housing enclosing a filtering medium and a stem which projects axially from the housing for insertion into a port of the mounting head. At least one mounting lug projects radially outwardly beyond the stem, with the lug being adapted to interengage with a support element of the mounting head upon insertion of the stem into the port and at least partial rotation of the cartridge. Preferably, the lug and support element include cooperating camming surfaces which cause the stem to be drawn into the port upon initial rotation of the cartridge in a first direction. In addition, further camming surfaces are provided between the cartridge and the mounting head which causes the stem to at least partially withdraw from the port upon rotation of the cartridge in an opposite direction. In the most preferred form, the additional camming surfaces do not become interengaged until the lug is disengaged from the support element.

In accordance with another aspect of the invention, the filtering system further includes a plug which can be used in place of the filter cartridge to complete the fluid circuit through the mounting head. Preferably, the plug also incorporates multiple camming surfaces adapted to cooperate with the mounting head structure to enhance the seating and withdrawal of the plug respectively.

In accordance with a further aspect of the invention, a switch assembly is provided to sense the attachment of the filter cartridge or the plug to the mounting head. If either attachment is sensed, water is permitted to flow to a water fountain and/or automatic ice maker. If no attachment is sensed at the mounting head, the flow of water is prevented.

In accordance with a particular aspect of the invention, a system is provided to determine when the water filter needs to be replaced based on sensing actuating time periods for a flow control valve, calculating a flow volume for each actuation period, summing each of the calculated flow volumes to obtain an accumulated flow volume, and comparing the accumulated flow volume with a threshold value. When the accumulated flow volume reaches or exceeds the threshold value, an indicator light or other similar device is activated to signal the need to replace the water filter. The accumulated flow volume value is reset, either manually or automatically, upon replacement of the water filter.

Additional objects, features and advantages of the water filtering system of the invention will become more readily apparent from the following detailed description of a preferred embodiment, when taken in conjunction with the drawings wherein like reference numerals refer to corresponding parts in the several views.

DETAILED DESCRIPTION OF THE PREFERRED EMBODIMENT

Figure 1:
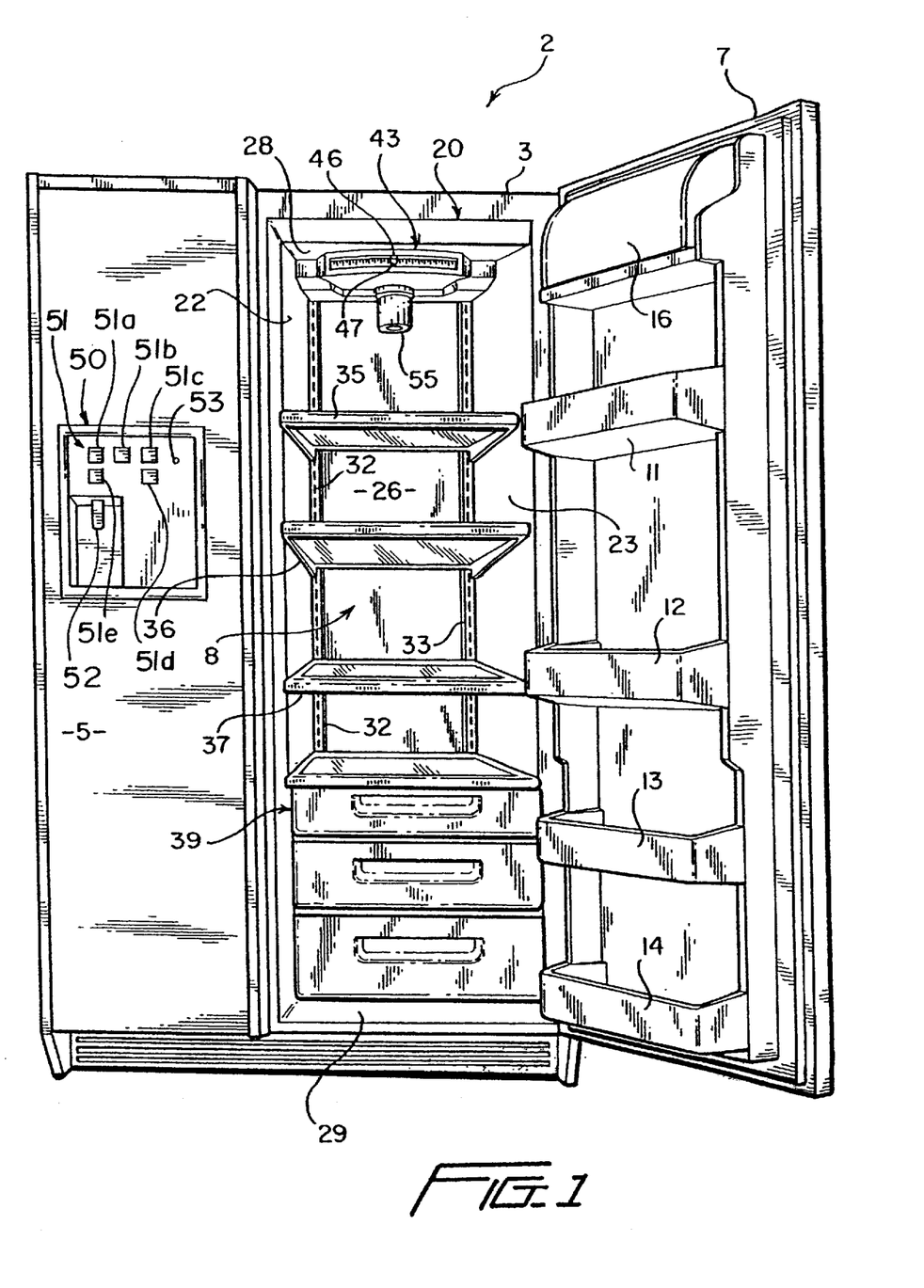
FIG. 1 is a perspective view of a side-by-side refrigerator incorporating a filtering assembly constructed in accordance with the present invention.

With initial reference to FIG. 1, a side-by-side refrigerator is generally indicated at 2. In a manner widely known in the art, a side-by-side refrigerator 2 is formed from a cabinet shell 3 to which is pivotably attached a freezer compartment side door 5 and a fresh food compartment side door 7. Side door 7 is shown open to expose a fresh food compartment 8 defined within cabinet shell 3. Fresh food compartment side door 7 supports a plurality of vertically spaced shelves 11–14 and is also preferably provided with a dairy compartment 16. In a preferred embodiment, fresh food compartment 8 is formed from an integral liner 20 having opposed side walls 22 and 23, a rear wall 26 and top and bottom walls 28 and 29. Secured to rear walls 26 by means of mechanical fasteners (not shown) are a pair of laterally spaced and vertically extending rails 32 and 33 that adjustably support various vertically spaced shelves 35–37, as well as a shelf supporting bin assembly generally indicated at 39.

Also shown mounted within fresh food compartment 8 at top wall 28 is a temperature control unit 43. Temperature control unit 43 is preferably molded of plastic and includes upper and lower slidable temperature control members 46 and 47 which can be used by a consumer to adjust the temperatures within side-by-side refrigerator 2 to preferable levels. As also shown in this figure, freezer compartment side door 5 is preferably provided with a dispensing unit 50 which can be used to selectively dispense either water or ice as selected through fountain controls as generally indicated at 51. For instance, fountain controls 51 preferably include buttons 51a and 51b for selecting between crushed and cubed ice respectively, a button 51c for selecting the dispensing of water, a light button 51d, and a lock button 51e. Furthermore, dispensing unit 50 includes a dispensing actuator 52 adapted to be displaced by a glass or the like in order to perform a dispensing operation, and a filter replacement indicator 53.

In general, the above-described structure of side-by-side refrigerator 2 is known in the art and does not form part of the present invention. Instead, this description is provided for the sake of completeness. The present invention is particularly directed to the incorporation of a water filtering system for use in purifying water supplied, either directly to dispensing unit 50 or to an automatic ice maker. The present invention is also directed to a replaceable filter, generally indicated at 55 in FIG. 1, which forms part of the water filtering system of the present invention. As shown, filter cartridge 55 preferably projects downward from within the housing of temperature control unit 43 at a central rear portion of fresh food compartment 8. This location is utilized in accordance with the preferred embodiment to provide a readily visible and easily accessible filter cartridge 55 that can be replaced by a consumer as needed.

Figure 2:
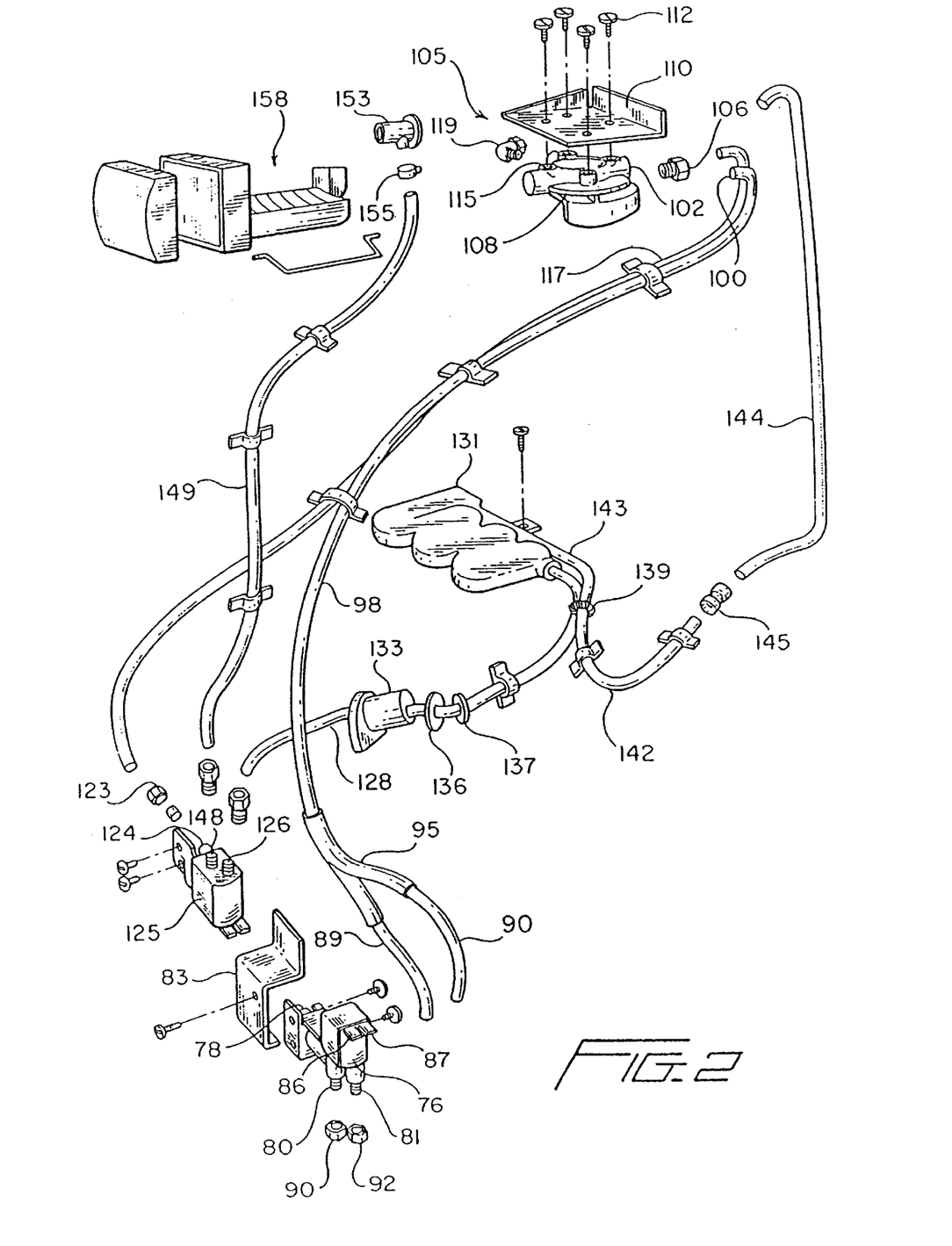
FIG. 2 is an exploded view of the filtering assembly of the invention.

Reference will now be made to FIG. 2 in detailing the overall components and their interconnections for the water filtering system of the present invention. In accordance with the preferred form of the invention, a water supply (not shown) is attached to refrigerator 2 at dual valve 76. More specifically, dual valve 76 includes an inlet 78 for attachment of the supply line, as well as first and second outlets 80 and 81. Dual valve 76 is attached to refrigerator 2 by means of bracket 83 and preferably constitutes a solenoid-type valve having electrical connectors 86 and 87 which can be utilized to fluidly interconnect inlet 78 to one or more of the first and second outlets 80 and 81 in the manner which will be described more fully below. Outlets 80 and 81 are respectively connected to first and second water delivery tubes 89 and 90, preferably through the use of compression nuts 90 and 92. First and second water delivery tubes 89 and 90 converge by means of a Y-connector 95 into a common water delivery tube 98. Tube 98 has a terminal end 100 that is connected to a water inlet 102 of a filter cartridge mounting head 105 through a connector 106.

Filter cartridge mounting head 105 is used to support filter cartridge 55 and therefore it is preferably mounted such that at least a portion of the housing of temperature control unit 43 encloses filter cartridge mounting head 105. In any event, mounting head 105 includes a main body 108 which is preferably injection molded of plastic and attached to a bracket 110 by means of various screws 112. In addition to water inlet 102, mounting head 105 has associated therewith a water outlet 115 to which is attached a tube 117 by means of an elbow connector 119. The manner in which water flows through mounting head 105 from tube 98 to tube 117 will be detailed more fully below. An opposing end of tube 117 is connected through a fitting 123 to an inlet port 124 of a dispenser valve 125. Dispenser valve 125 includes a first outlet 126 which is connected through a conduit 128 that leads to a water tank 131. In a manner known in the art, water tank 131 is preferably mounted within fresh food compartment 8, such as at lower rear portion thereof.

Since both valves 76 and 125 are preferably located outside of fresh food compartment 8, conduit 128 has positioned therealong a spacer 133 that extends through liner 20 to permit sealing around conduit 128 during the injection molding of foamed insulation within cabinet 3 in a manner widely known in the art. For additional sealing purposes, seals 136, 137 and 139 are also provided. Seal 139 is actually associated with a tube 142 that leads from water tank 132. More specifically, tube 142 includes a first section 143 that is interconnected to a second section 144 through a connector 145. Second section 144 of tube 142 directly leads to the fountain of water dispensing unit 50. Dispenser valve 125 also includes a second outlet 148 to which is attached a tube 149 that leads to a nozzle 153. More specifically, tube 149 is attached to nozzle 153 by means of a clamp 155 and nozzle 153 is utilized to provide a flow of water to an ice maker generally indicated at 158.

With this arrangement, water supplied to refrigerator 2 is first delivered to valve 76. Whether ice maker 158 or the fountain associated with dispensing unit 50 requires water will determine which side of dual valve 76 is actuated, thereby controlling the connection between the first and second water delivery tubes 89 and 90 with the flow into inlet 78. As will be discussed more fully below, mounting head 105 would normally have filter cartridge 55 attached thereto, such that water would flow into inlet 102 through common tube 98, would be forced to flow through filter cartridge 55 and would be delivered to a water outlet 115. The filtered water would then be delivered through tube 117 to dispenser valve 125 which would regulate whether the water would flow to water tank 131 and then dispenser unit 50 or to ice maker 158.

At this point, it should be realized that two valves 76 and 125 are utilized to control the flow of water in the overall water circuit. These multiple valves are utilized in order to separate the electrical nodes and allow the water to flow to its desired source. However, there are various other types of water circuit arrangements which could be devised to perform this function, such as utilizing a valve in place of dual valve 76 which has a single input and output in combination with dispenser valve 125. The disclosed embodiment is preferred since a single signal received from either the dispenser unit 50 or ice maker 158 can be used to control both valves 76 and 125 such that the water is routed in the desired path. In any case, all of the water for either the dispensing unit 50 or ice maker 158 is directed through mounting head 105 and, so long as the consumer has attached a suitable filter cartridge 55, the purity of the water delivered either to dispensing unit 50 or ice maker 158 will be enhanced.

Figures 3, 4, 5:
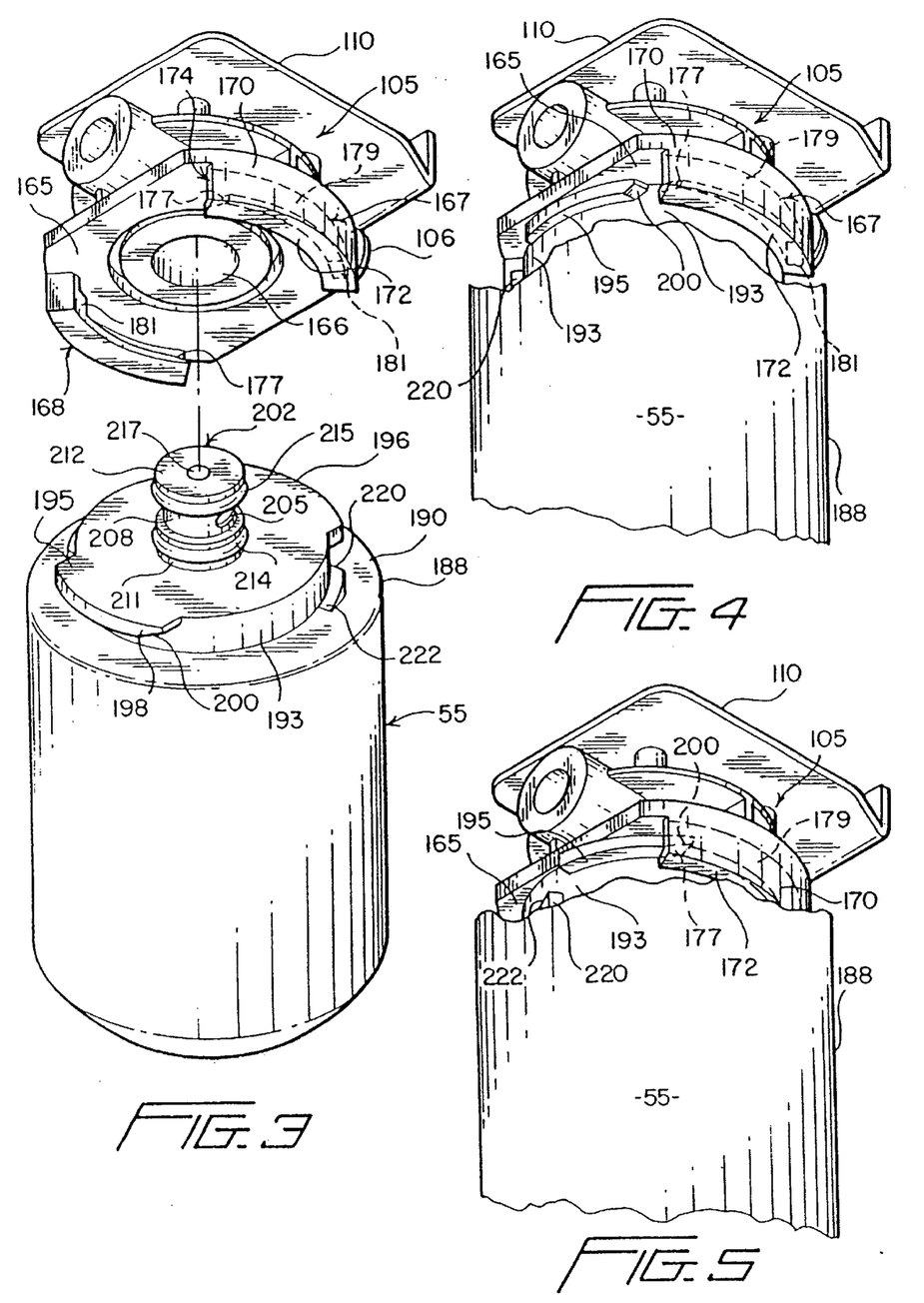
FIG. 3 shows a water filter cartridge incorporated in the filtering assembly of the invention in a disengaged position.
FIG. 4 shows the water filter cartridge of FIG. 3 initially attached to a filter mounting head.
FIG. 5 illustrates the water filter cartridge attached to the mounting head following partial rotation of the cartridge.

A particular aspect of the present invention is the construction of filter cartridge 55 and the manner in which it is assembled and disassembled from mounting head 105. Reference will now be made to FIG. 3 in detailing the preferred construction of both filter cartridge 55 and mounting head 105. As shown, mounting head 105 includes a base plate 165 which is formed with a central, filter stem receiving port 166. Projecting downwardly at spaced circumferential positions from base plate 165 is a pair of arcuate support elements 167 and 168. Since the preferred construction of each of the support elements 167 and 168 is identical, the preferred construction for support element 167 will now be described in detail and it is to be understood that a corresponding structure is preferably utilized for support element 168. Support element 167 is actually defined by a substantially vertical, arcuate side wall 170 which projects downward from base plate 165, as well as a radially, inwardly projecting flange 172. With this construction, flange 172 is located in a plane below base plate 165 such that a mounting channel 174 is defined therebetween. At the entrance to mounting channel 174, flange 172 is formed with a ramp portion 177 that leads to a central portion 179 and an upstanding abutment stop 181.

On the other hand, filter cartridge 55 includes a housing 188 having an upper surface portion 190. Above surface portion 190 is provided a mounting projection 193 that includes a pair of opposed, radially outwardly extending lugs 195 and 196. In a manner analogous to support elements 167 and 168, each of lugs 195 and 196 are correspondingly constructed such that the preferred construction for a lug 195 will now be described in detail and it is to be understood that lug 196 has a corresponding construction. Lug 195 includes a leading edge 198 that is preferably chamfered or tapered at 200. Filter cartridge 55 also includes a stem 202 which projects axially above mounting projection 193. Stem 202 is provided with a pair of opposed fluid entry ports, one of which is shown at 205, formed in a reduced diametric central portion 208. Axially spaced in opposing directions from central portion 208, stem 202 includes enlarged diametric portions 211 and 212, each of which is formed with an annular groove within which is seated a respective O-ring 214, 215. As clearly shown in this figure, stem 202 is also formed with a terminal, upper port 217. Filter cartridge 55 is further preferably provided with a projection 220 that extends upward from upper surface portion 190 and radially from mounting projection 193. As clearly shown in this figure, projection 220 is provided with a sloping surface 222 which tapers in a direction substantially corresponding to that of leading edge 198. In the most preferred form of the invention, two such projections 220 are provided at circumferentially spaced positions from both each other and lugs 195 and 196.

Figure 6:
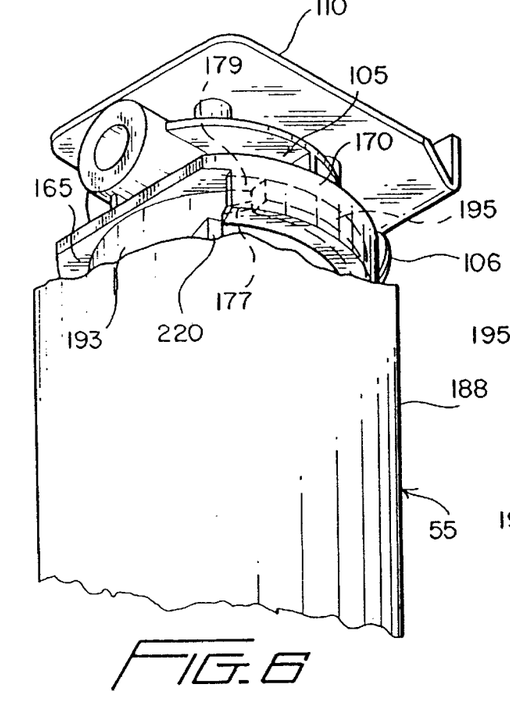
FIG. 6 illustrates the water filter cartridge in a fully attached position with the mounting head.

With this construction, a consumer can manually grasp filter cartridge 55 and insert stem 202 into receiving port 166 of mounting head 105 with lugs 195 and 196 being circumferentially positioned between support elements 167 and 168. In other words, upon initial attachment of filter cartridge 55 to mounting head 105, filter cartridge 55 will be arranged relative to mounting head 105 in the manner generally illustrated in FIG. 4. In achieving this position, it should be realized that O-rings 214 and 215 create some resistance to full insertion of stem 202 within receiving port 166. Therefore, unless filter cartridge 55 is axially forced to cause mounting projection 193 to abut base plate 165, there will likely be a certain axial gap between mounting projection 193 and base plate 165. However, upon initial rotation of filter cartridge 55 relative to mounting head 105, the leading edge 198 of each lug 195, 196 will cam with a ramp 177 of a respective support element 167, 168 which will automatically cause filter cartridge 55 to be axially drawn towards base plate 165 (see FIG. 5). In other words, upon initial rotation of filter cartridge 55 in a first direction, stem 102 will be fully drawn into receiving port 166. Thereafter, filter cartridge 55 can be continually rotated in the same direction as lugs 195 and 196 are further received within respective mounting channels 174 until abutment stops 181 are engaged (see FIG. 6). This represents the fully seated and locked position for filter cartridge 55. In this position, water flowing into water inlet 102 of mounting head 105 will be at a location corresponding to reduced diametric central portion 208 such that the water will be caused to flow into opposed entry ports 205 of filter cartridge 55. The water will then flow into housing 188 for purification as it flows through a filtering medium and then out upper port 217. Since upper port 217 is in fluid communication with water outlet 115, the filtered water can then flow through tube 117 to dispenser valve 125.

Figure 7:
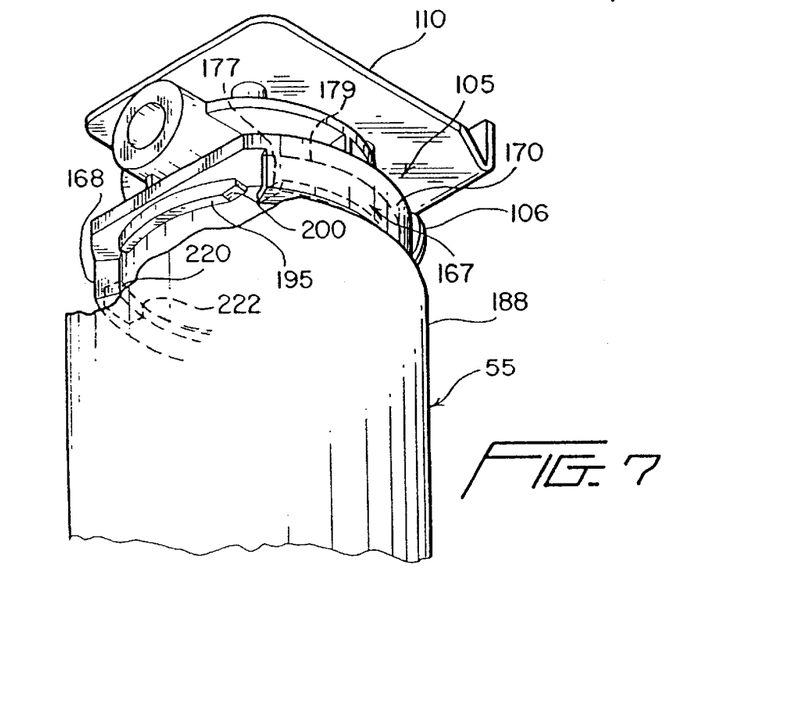
FIG. 7 illustrates the manner in which the water filter cartridge is disengaged from the mounting head upon rotation of the cartridge.

As indicated above, O-rings 214 and 215 provide some resistance to the full insertion of stem 202 within receiving port 166. When it is desired to remove or replace filter cartridge 55, a similar resistance is also encountered. Actually, given pressures acting on at least central portion 208 within mounting head 105, even greater forces resisting removal of filter cartridge 55 can be encountered. Although these forces can be overcome by a greater axial downward force being exerted on the filter cartridge 55, such an exerted force could damage the mounting of bracket 110. However, in accordance with the present invention, the interaction between filter cartridge 55 and mounting head 105 during relative rotation advantageously assists in the removal of filter cartridge 55. More specifically, as filter cartridge 55 is moved from the fully locked position of FIG. 6, through the partially locked position of FIG. 5 and then to the position of FIG. 7, the sloping surface 222 of each projection 220 will cam with a respective support element 167, 168 to cause filter cartridge 55 to be axially shifted away from base plate 165 such that stem 202 of filter cartridge 55 automatically becomes partially withdrawn from receiving port 166 upon the simple rotation of filter cartridge 55.

Although a preferred embodiment for the structure and mounting of filter cartridge 55 has been described, it should be recognized that there are various other types of camming arrangements which could be readily utilized to enhance the axial shifting of filter cartridge 55 relative to mounting head 105 upon rotating of filter cartridge 55. For instance, although lugs 195 and 196, as well as projections 220, are preferably provided on filter cartridge 55 and support elements 167 and 168 are formed as part of mounting head 105, the position of these elements are interchangeable and could be readily reversed. At this point, it is simply important to note the ability of the mounting arrangement to provide for the axial shifting of filter cartridge 55 relative to mounting head 105 upon rotation of filter cartridge 55 in either direction. This axial shifting is particularly advantageous during the removal of filter cartridge 55 and is considered to represent a significant advantage over the known prior art.

Figure 8:
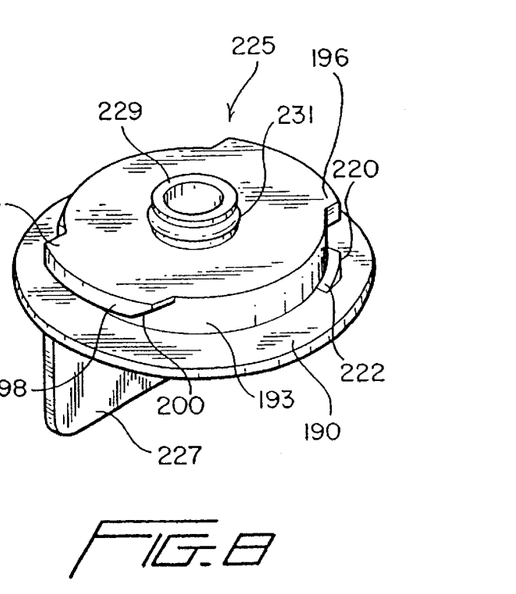
FIG. 8 is a perspective view of a plug which can be attached to the mounting head in place of the water filter cartridge of the invention.

Based on the above description, it should also be realized that mounting head 105 does not incorporate any complicated internal valving structure that would need to be activated upon positioning of stem 202 within receiving port 166. Therefore, with this system, it would be possible for water to flow out of receiving port 166 of mounting head 105 if doors 5 and 7 of refrigerator 2 were closed and dispenser unit 50 and/or ice maker 158 signal the need for water in the absence of filter cartridge 55. In case another filter cartridge 55 is not readily available for replacement purposes, the overall filtering system of the present invention also contemplates the utilization of a bypass plug such as that shown at 225 in FIG. 8. In general, plug 225 is adapted to be mounted to head 105 in a manner directly analogous to that described above with respect to filter cartridge 55 and therefore includes corresponding mounting structure. For at least these reasons, common reference numerals have been utilized in FIG. 8 and the reiteration of this structure will not be presented here. However, it should be noted that plug 225 is provided with an elongated tab 227 which can be grasped by a user for mounting of plug 225 to mounting head 105. In addition, since plug 225 is only intended to close off receiving port 166 and not to divide any flow path between water inlet 102 and water outlet 115, plug 225 includes a stem 229 which is actually shorter than stem 202 and which incorporates a single O-ring 231. More importantly, plug 225 includes corresponding lug and projection structure such that the axial shifting of stem 229 into and out of receiving port 166 upon rotation of plug 225 is performed in a manner directly corresponding to that described above with respect to filter cartridge 55.

As indicated above, it is possible for water to flow out of receiving port 66 of mounting head 105 in the absence of filter cartridge 55 or plug 225. When a replacement filter cartridge 55 is not readily available, it is intended that plug 225 be attached to mounting head 105. However, in accordance with the present invention, it is further desired to incorporate an arrangement which assures that either one of filter cartridge 55 or plug 225 is attached to mounting head 105 before water is permitted to flow to water inlet 102 of mounting head 105. As will be described more fully below, it is desired in accordance with the present invention to individually detect the presence of filter cartridge 55, plug 225 or the absence of either filter cartridge 55 or plug 225.

Figure 9:
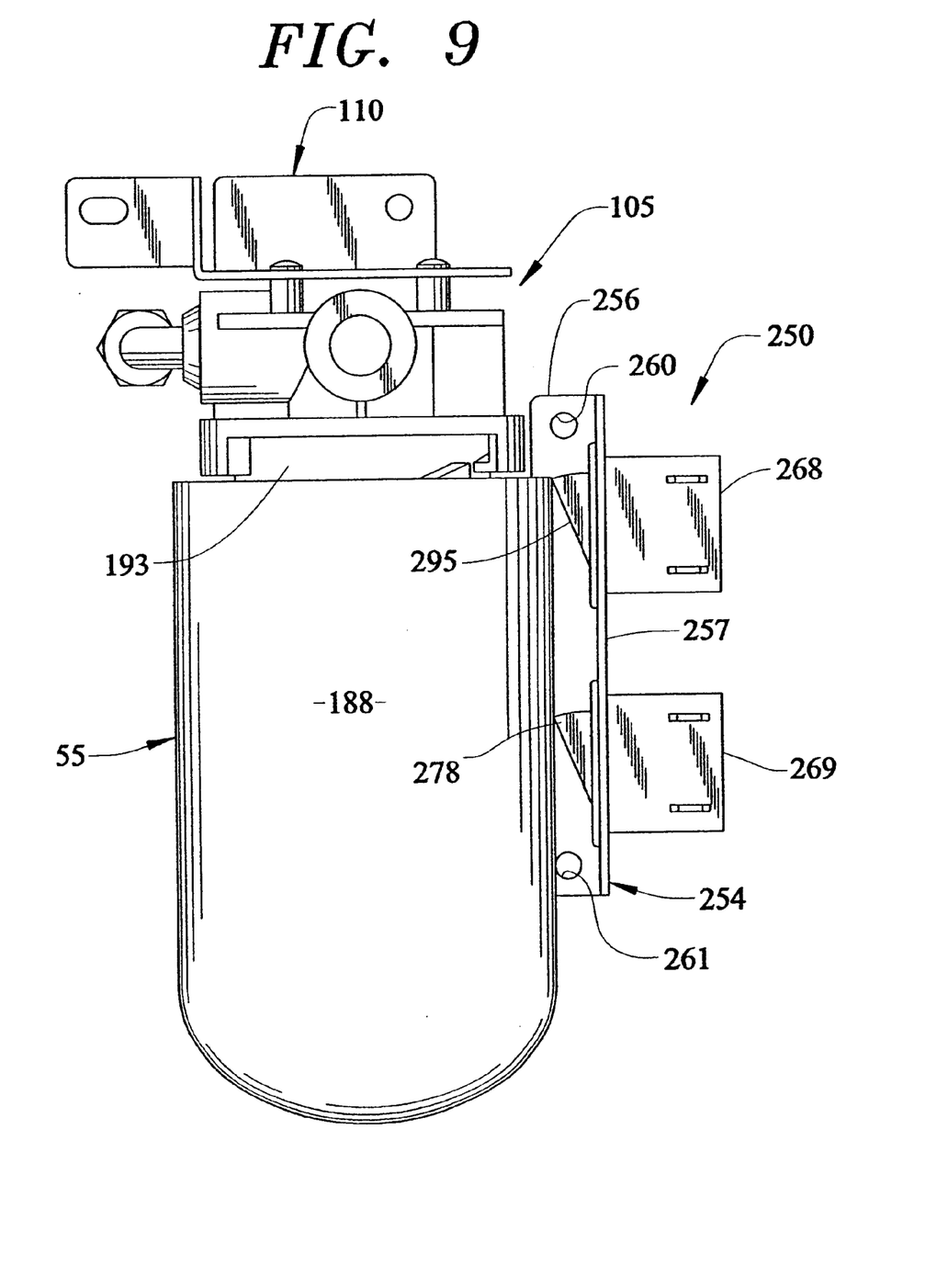
FIG. 9 is a view similar to that of FIG. 6, but also illustrating the presence of a switch assembly provided in accordance with the present invention.
Figure 10:
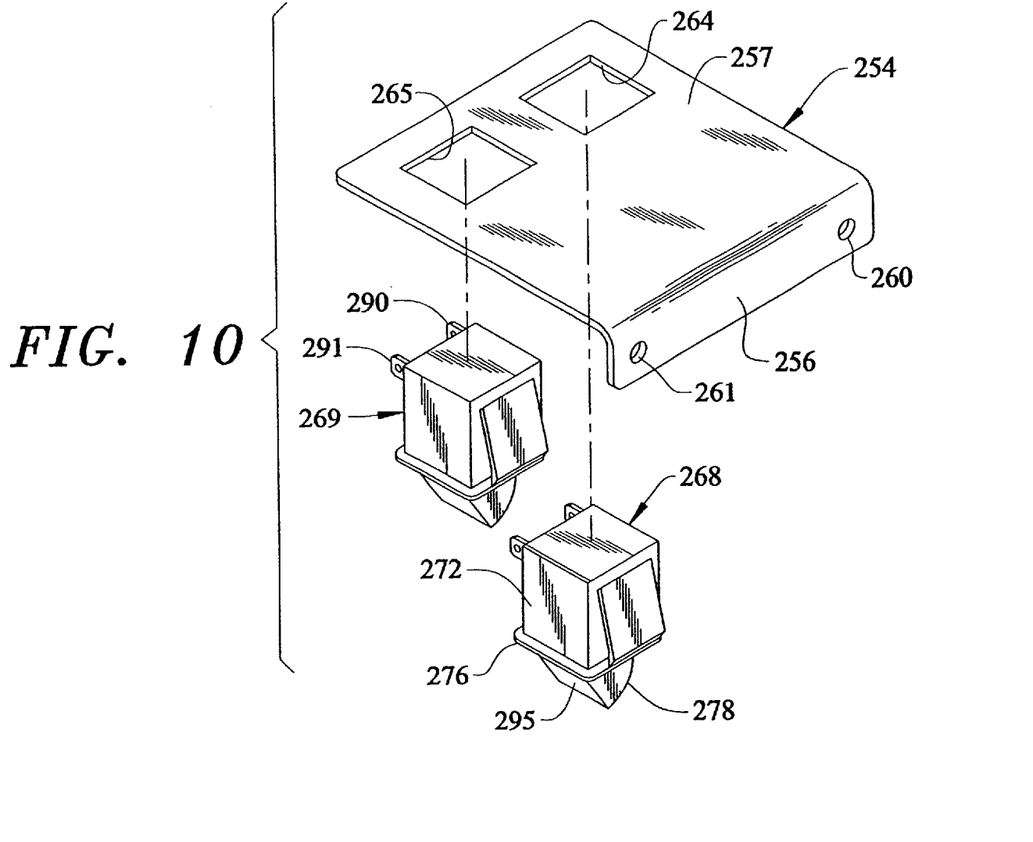
FIG. 10 is an exploded view of the switch assembly of FIG. 9.
Figure 11:
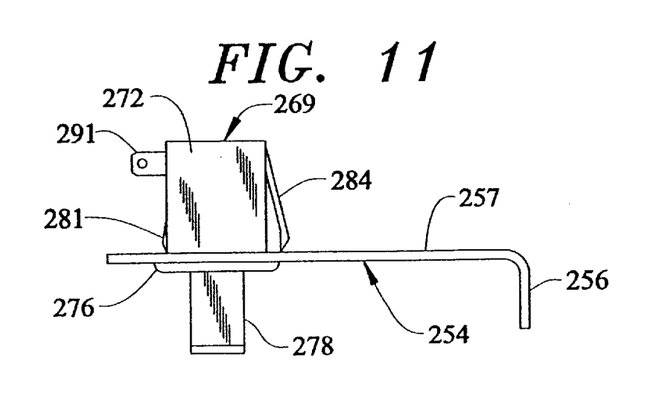
FIG. 11 is a side view of the switch assembly.

With initial reference to FIGS. 9–11, the function of sensing the attachment of either filter cartridge 55 or plug 225 to mounting head 105 is performed by incorporating a switch assembly 250 which is secured along side mounting head 105. In accordance with most preferred embodiment of the invention, switch assembly 250 includes a generally L-shaped mounting plate 254 as defined by a first leg 256 and a second leg 257. First leg 256 is preferably provided with a pair of spaced apertures 260 and 261 and second leg 257 is provided with a pair of enlarged openings 264 and 265. Apertures 260 and 261 are utilized to secure mounting plate 254 within fresh food compartment 8 and, more particularly, to rear wall 26 of fresh food compartment 8.

Openings 264 and 265 receive respective switches 268 and 269. Each switch 268, 269 includes a housing 272 having, at one end portion thereof, an enlarged flange 276. Each switch 268, 269 also includes a switching element 278 that is preferably of the pivoting, plunger-type generally known in the art. As clearly shown in these figures, switches 268 and 269 are secured within openings 264 and 265. For this purpose, each housing 272 preferably includes a projection 281 on one side wall portion thereof and, on an opposing side wall portion, a resilient finger 284. In this fashion, housing 272 of each switch 268, 269 can be inserted in the respective opening 264, 265 by first angling the switch such that housing 272 projects through the opening 264, 265 until a portion of flange 276 abuts second leg 257 with projection 281 also abutting second leg 257. Then the switch 268, 269 is further pushed through the respective opening 264, 265 which causes the deflection of resilient finger 284. Once resilient finger 284 extends entirely through the respective opening 264, 265, finger 284 will shift away from housing 272 to assume the position shown in FIG. 11. Therefore, in this manner, switches 268, 269 are generally snap-fit into openings 264 and 265 respectively.

Housing 272 of each switch 268 and 269 has projecting therefrom a pair of electrical contacts 290 and 291. As will be detailed more fully below, switches 268 and 269 will sense the presence of any attachment to mounting head 105 through the shifting of one or more of switching elements 278 and the repositioning of these elements 278 will be relayed to a control unit through contacts 290 and 291.

Figure 12:
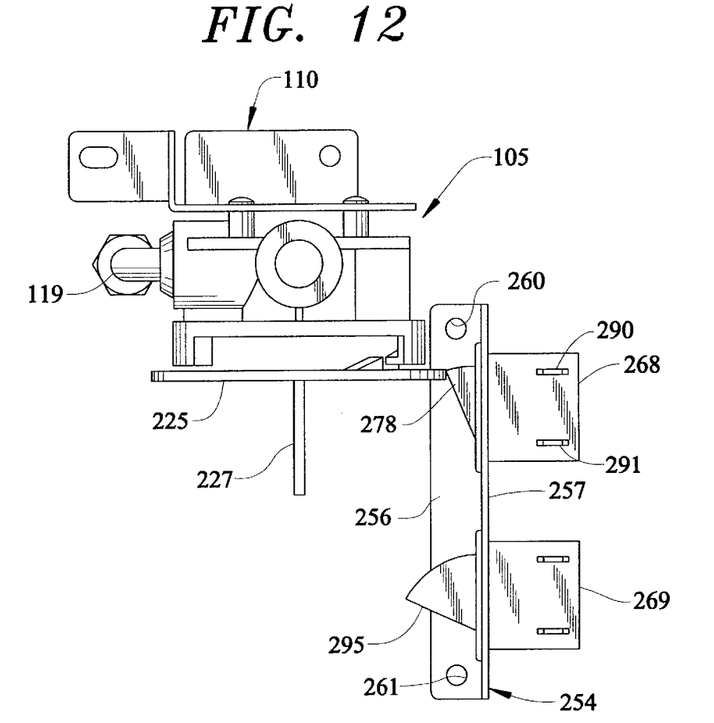
FIG. 12 shows the interaction between the switch assembly of FIGS. 9–11 and the plug of FIG. 8.

At this point, it should be noted that the particular type of switch 268, 269 utilized in accordance with the invention could readily vary. However, it is considered important that switching element 278 includes some type of camming surface 295 such that each of the switches 268 and 269 can be readily repositioned upon the attachment of at least one of filter cartridge 55 and plug 225. More specifically, with particular reference to FIG. 9, it should be realized that mounting plate 254 is secured adjacent mounting head 285 such that switches 268 and 269 are arranged at varying levels below mounting head 105. When filter cartridge 55 is attached to mounting head 105 as shown in this figure, housing 188 of filter cartridge 55 is forced to ride along the camming surface 295 of each switching element 278 and to depress each switching element 278. Therefore, given the height of housing 188 of filter cartridge 55, both switches 268 and 269 will be depressed when filter cartridge 55 is secured to mounting head 105. On the other hand, when plug 225 is utilized in replace of filter cartridge 55, plug 225 will only contact and depress switching element 278 of first switch 268 as clearly shown in FIG. 12. Therefore, when plug 225 is utilized, switching element 278 of switch 269 is not depressed.

Figure 13:
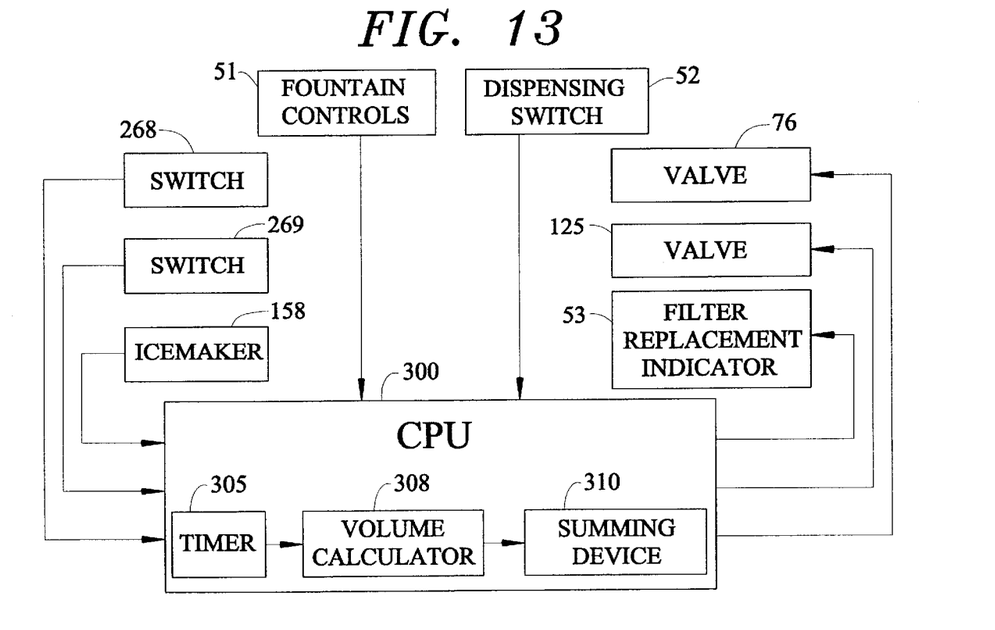
FIG. 13 is a block diagram of a control arrangement associated with the filtering system of the invention.

The positioning of each of the switching elements 278 of switches 268 and 269 are relayed in accordance with the invention to a controller 300 generally indicated at FIG. 13. Based on the electrical signals received by controller 300, it is readily known whether mounting head 105 has attached thereto a filter cartridge 55, a plug 225 or nothing. Controller 300 operates to permit water to flow to inlet 102 of mounting head 105 when it is determined that either filter cartridge 55 or plug 225 is secured to mounting head 105. In other words, if either of the switching elements 278 of switches 268 and 269 is depressed, controller 300 permits water to flow to inlet 102. On the other hand, if neither switching element 278 is depressed, controller 300 prevents the flow of water to inlet 102 such that, even in the absence of either filter cartridge 55 or plug 225, it will not be possible for water to flow out of receiving port 166 of mounting head 105. Although the particular manner in which controller 300 can regulate the flow of water can vary in accordance with the invention, the most preferred embodiment of the invention has controller 300 electrically linked to contacts 86 and 87 of dual valve 76 for this purpose.

Based on the above, it should be readily apparent that the incorporation of the switching assembly 250 assures that water will only flow through the overall filtering system when either filter cartridge 55 or plug 225 is attached to mounting head 105. Therefore, the accidental discharge of water into fresh food compartment 8 is positively prevented. Still, the overall filtering system avoids the use of any complicated internal valving structure within mounting head 105. Instead, switches 268 and 269 are utilized to electrically signal the presence or absence of filter cartridge 55 and plug 225.

Although mounting head 105 and switch assembly 250 are shown positioned within fresh food compartment 8 due to the embodiment shown for refrigerator 2, the invention is equally applicable in various types of refrigerator arrangements, including water coolers. Therefore, mounting head 105 could be positioned in a completely different portion of the refrigerator, such as a service compartment or even adjacent the refrigerator, without departing from the invention. However, ease of accessibility is preferably provided. In addition, the exact orientation of switch assembly could vary, such as between vertical and horizontal configurations, without affecting the function of the overall arrangement.

Obviously, filter cartridge 55 will have a useful life span. The present invention is particularly directed to a system for indicating when it is necessary to replace filter cartridge 55. In general, the invention is concerned with calculating the amount of water filtered by a given filter cartridge 55 and signaling that the filter 55 needs to be replaced when the calculated amount reaches a threshold value. As indicated above, valve 125 is controlled to enable water flow to each of the dispensing unit 50 and ice maker 158, and controller 300 regulates the activation of valve 125. As generally shown in FIG. 13, controller receives signals from fountain controls 51, dispensing switch 52 and ice maker 158. Based on these signals, controller 300 can determine if water flow is needed to dispensing unit 50 or ice maker 158 in order to regulate valve 125 to establish the desired flow path. In addition, controller 300 is used to establish overall system flow through valve 76 as already discussed above.

In accordance with the most preferred form of the invention, controller 300 incorporates a timing circuit or timer 305 which is used to sense the duration of each actuation period for valve 125. The sensed actuation period is relayed to a volume calculator 308 which determines the volume of water flow through valve 125, and hence the overall system, by multiplying the actuation time by a flow rate value which is stored in controller 300 based on the specifications of valve 125. For instance, the flow rate to dispensing unit 50 can be established between 150–500 cc per minute, while the ice maker 158 typically requires a flow rate in the order of 115–154 cc per minute. Of course, these values could greatly vary without departing from the invention. In any event, the calculated volume for each actuation period is conveyed to a summing device 310 which is also part of controller 300. Summing device 310 functions to maintain an accumulated volume for filter cartridge 55 and to compare the accumulated volume to a threshold value. When the threshold value is reached, controller 300 illuminates filter replacement indicator 53 in order to signal the consumer that filter cartridge 55 needs to be replaced. Indicator 53 is preferably constituted by a light diode arranged within the area of dispenser unit 50. However, other types of signaling arrangements could be equally utilized, including an audio signal.

As indicated above, the water flow system for refrigerator 2 can operate with either filter cartridge 55 or plug 225 in place. In either case, controller 300 would have to regulate the operation of valve 125. In accordance with the invention, it is desirable to have timer 305 sense the actuation of valve 125 and relay this information to volume calculator 308 only when filter 55 is attached to mounting head 105. Therefore, controller 300 only operates timer 305 when a signal is received from switches 268 and 269, thereby indicating the presence of filter cartridge 55.

After the filter cartridge 55 is replaced, it is desirable to reset the accumulated filtered water volume value such that the accumulated value will start again at zero for the subsequent filter cartridge 55 attached to mounting head 105. In the most preferred forms of the invention, this can be carried out in one of two ways. In accordance with a first embodiment, resetting is accomplished by pressing light button 51*d* and lock button 51*e* simultaneously for a few seconds, e.g., 3 seconds. In accordance with a second embodiment, the resetting function is performed automatically by controller 300 based on signals received from at least switch 269. That is, when switch 269 changes from a state indicating the presence of filter cartridge 55, to a state indicating the absence of a filter cartridge 55, and then back to a state indicating the presence of another filter cartridge 55, the accumulated water volume value is reset to zero.

Although described with respect to preferred embodiments of the invention, it should be readily understood that various changes and/or modifications can be made to the present invention without departing from the spirit thereof. In any event, the invention is only intended to be limited by the scope of the following claims.

We claim:

1. In a refrigerator including a water dispenser and an ice maker, a system for determining and indicating a need to replace a water filter comprising:

a mounting head including a water inlet connected to a fresh water supply, a water outlet, and a connection port, fluidly interposed between the water inlet and the water outlet, adapted to receive a replaceable water filter, said water outlet being fluidly interconnected to each of the water dispenser and the ice maker;

a water filter removably attached to the connection port of the mounting head;

at least one valve, fluidly interposed between the water outlet of the mounting head and each of the water dispenser and the ice maker, which can be actuated to provide a controlled flow of filtered water to a select one of the water dispenser and the ice maker;

a control unit for actuating the at least one valve in order to direct the controlled flow of filtered water to the select one of the water dispenser and the ice maker, said control unit including a timing device for measuring a duration of actuation of the at least one valve, a volume calculating device for determining a volume of filtered water associated with the duration of actuation, and a summing device for maintaining an accumulated, filtered water volume; and an indicator, linked to the control unit, for signaling when the accumulated, filtered water volume reaches a threshold value and the water filter needs to be replaced.

2. The system according to claim 1, wherein the at least one valve comprises a single solenoid valve having an inlet, connected to the water outlet of the mounting head, and first and second outlets leading to the water dispenser and the ice maker, respectively.

3. The system according to claim 1, further comprising: an electrical switching unit located at the mounting head, said switching unit detecting a presence or absence of the water filter on the mounting head.

4. The system according to claim 3, wherein the timing device only measures the duration of actuation of the at least one valve when the switching unit signals the presence of the water filter on the mounting head.

5. The system according to claim 1, wherein the refrigerator includes a front panel portion at which the water dispenser is disposed, said indicator being constituted by an illuminating element provided on the front panel portion.

6. The system according to claim 1, further comprising: means for resetting the summing device upon replacement of the water filter.

7. In a refrigerator including a water dispenser and an ice maker, a system for determining and indicating a need to replace a water filter comprising:

a mounting head including a water inlet connected to a fresh water supply, a water outlet, and a connection port, fluidly interposed between the water inlet and the water outlet, adapted to receive a replaceable water filter, said water outlet being fluidly interconnected to each of the water dispenser and the ice maker;

a water filter removably attached to the connection port of the mounting head;

an electrical switching unit located at the mounting head, said switching unit detecting a presence or absence of the water filter on the mounting head;

at least one valve, fluidly interposed between the water outlet of the mounting head and each of the water dispenser and the ice maker, which can be actuated to provide a controlled flow of filtered water to a select one of the water dispenser and the ice maker;

a control unit for actuating the at least one valve in order to direct the controlled flow of filtered water to the select one of the water dispenser and the ice maker, said control unit further accumulating an operating parameter of the system indicative of the amount of flow through the water filter, said control unit only accumulating the operating parameter when the electrical switching unit detects the presence of the water filter; and an indicator for signaling a need to replace the water filter based on the accumulated operating parameter.

8. The system according to claim 7, wherein the at least one valve comprises a single solenoid valve having an inlet, connected to the water outlet of the mounting head, and first and second outlets leading to the water dispenser and the ice maker, respectively.

9. The system according to claim 7, wherein the refrigerator includes a front panel portion at which the water dispenser is disposed, said indicator being constituted by an illuminating element provided on the front panel portion.

10. The system according to claim 7, further comprising: means for resetting the accumulated operating parameter upon replacement of the water filter.

11. The system according to claim 7, wherein said operating parameter is constituted by a duration of actuation of the at least one valve, the control unit including a timing device for measuring the duration of actuation of the at least one valve and a volume calculating device for determining a volume of filtered water associated with the duration of actuation.

12. The system according to claim 11, wherein the control unit further includes a summing device for maintaining an accumulated, filtered water volume.

13. A method of determining and indicating a need to replace a water filter of a refrigerator water flow system including a water dispenser and an ice maker comprising:

sensing an actuation of at least one flow control valve used to regulate a flow of filtered water to a desired one of the water dispenser and the ice maker;

timing a duration of actuation of the at least one valve;

calculating a volume of filtered water associated with the duration of actuation;

adding the calculated volume of filtered water to an accumulated, filtered water volume;

comparing the accumulated, filtered water volume with a threshold value; and indicating the need to replace the water filter when the accumulated, filtered water volume reaches the threshold value.

14. The method according to claim 13, further comprising:

sensing a presence of a water filter in fluid communication with the water dispenser and the ice maker; and timing the duration of actuation of the at least one valve only when the presence of the water filter is detected.

15. The method according to claim 13, further comprising: resetting the accumulated, filtered water volume upon replacement of the water filter.

16. A method of determining and indicating a need to replace a water filter of a refrigerator water flow system including a water dispenser and an ice maker comprising:

electrically sensing the presence or absence a water filter;

accumulating an operating parameter indicative of the amount of water flowing through the system, only when the presence of the water filter is sensed; and indicating the need to replace the water filter when the accumulated operating parameter reaches a threshold value.

17. The method according to claim 16, further comprising: resetting the accumulated operating parameter upon replacement of the water filter.

18. The method according to claim 16, wherein accumulating the operating parameter includes:

sensing an actuation of at least one flow control valve used to regulate a flow of filtered water to a desired one of the water dispenser and the ice maker;

timing a duration of actuation of the at least one valve;

calculating a volume of filtered water associated with the duration of actuation; and adding the calculated volume of filtered water to an accumulated, filtered water volume.

* * * * *